United States Patent
Rocha et al.

(10) Patent No.: US 11,322,783 B2
(45) Date of Patent: May 3, 2022

(54) SYSTEMS AND METHODS FOR PROVIDING SAFE BATTERY REMOVAL FROM A FLASH MEMORY BASED ELECTRONIC DEVICE

(71) Applicant: Plantronics, Inc., Santa Cruz, CA (US)

(72) Inventors: Ryan Douglas Rocha, Soquel, CA (US); Thomas G Criswell, Santa Cruz, CA (US); Jesus Arias Duarte, Tijuana (MX); Anfeng Yin, Suzhou (CN)

(73) Assignee: PLANTRONICS, INC., Santa Cruz, CA (US)

( * ) Notice: Subject to any disclaimer, the term of this patent is extended or adjusted under 35 U.S.C. 154(b) by 413 days.

(21) Appl. No.: 16/538,627

(22) Filed: Aug. 12, 2019

(65) Prior Publication Data

US 2021/0050627 A1 Feb. 18, 2021

(51) Int. Cl.

| | |
|---|---|
| *H01M 10/42* | (2006.01) |
| *H02J 7/00* | (2006.01) |
| *G06F 1/16* | (2006.01) |
| *H01M 50/209* | (2021.01) |
| *H01M 50/247* | (2021.01) |
| *H01M 10/48* | (2006.01) |
| *H01M 50/552* | (2021.01) |

(Continued)

(52) U.S. Cl.
CPC ........ *H01M 10/425* (2013.01); *G06F 1/1635* (2013.01); *H01M 10/486* (2013.01); *H01M 50/209* (2021.01); *H01M 50/247* (2021.01); *H01M 50/543* (2021.01); *H01M 50/552* (2021.01); *H02J 7/0021* (2013.01); *H02J 7/0047* (2013.01); *H01M 50/555* (2021.01); *H01M 2010/4271* (2013.01); *H01M 2200/105* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 7,161,495 B1 * | 1/2007 | Kilbourne, II | .......... G06F 1/263 340/506 |
| 2004/0196599 A1 * | 10/2004 | Kim | ..................... H01M 50/572 361/18 |

(Continued)

*Primary Examiner* — Jonathan Crepeau
(74) *Attorney, Agent, or Firm* — Slayden Grubert Beard PLLC (57) ABSTRACT

A system for managing a battery removal from an electronic device is provided. The electronic device includes a battery interface including multiple battery coupling contacts that engage with battery contacts of the battery in an installed position of the battery. A battery removal detector is configured to detect, based on signals received via the battery interface, an ongoing battery removal process during which first battery contact(s) are disconnected from corresponding first interface contact(s) while second battery contact(s) remain connected with second battery coupling contact(s), and in response, to output a battery removal signal. The system also includes a controller that receives the battery removal signal and, still during the battery removal process, controls a memory device of the electronic device to prevent or complete a defined operation (e.g., writing of persistent storage keys) prior to completion of the battery removal process, to thereby prevent a corruption of the memory device.

23 Claims, 5 Drawing Sheets

(51) Int. Cl.
*H01M 50/543* (2021.01)
*H01M 50/555* (2021.01)

(56) References Cited

U.S. PATENT DOCUMENTS

2016/0234605 A1\* 8/2016 Kindred ................ H04R 25/30
2017/0045926 A1\* 2/2017 Powell ................ G06F 1/3296

\* cited by examiner

SYSTEMS AND METHODS FOR PROVIDING SAFE BATTERY REMOVAL FROM A FLASH MEMORY BASED ELECTRONIC DEVICE

TECHNICAL FIELD

The present invention relates to the field of battery-powered electronic devices, and more particularly to systems and methods that allow for safe battery removal while the electronic device is powered on.

BACKGROUND

This background section is provided for the purpose of generally describing the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many electronic devices are being used in modern everyday life. An increasing share of these electronic devices are battery-powered with removable or non-removable batteries.

From a standpoint of user convenience, electronic devices with non-removable batteries may be disadvantageous. For example, a headset with a depleted battery needs to be recharged first before it can be used again and thus results in necessary repeated 'downtime'. This is in particular inconvenient with wearable devices.

In some types of battery-powered electronic devices, removing the battery while the device is powered on can have unwanted consequences, such as a loss of data stored in device memory, or possibly even damaging the device itself.

Accordingly, an object exists to provide systems and methods that allow for safe battery removal from an electronic device, e.g., without causing flash memory corruption, while the electronic device is powered on, referred to herein as a "hot removal" of the battery.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

The above object and other objects are solved by the invention as defined in the independent claims. The dependent claims and the following specification discuss various embodiments.

According to one aspect of the present invention, a system for managing a removal of a battery from an electronic device may include a battery removal detector and a controller. The battery removal detector may include (a) sensor electronics configured to detect an ongoing battery removal process of the battery during which the battery remains conductively coupled to the electronic device to provide power to the electronic device; and (b) signaling electronics configured to output a battery removal signal in response to detecting the ongoing battery removal process by the sensor electronics. The controller may include electronics configured to (a) receive the battery removal signal from the battery removal detector, and (b) in response to receiving the battery removal signal and during the ongoing battery removal process, (automatically) control a memory device of the electronic device to prevent or complete a defined operation prior to a completion of the battery removal process in which the battery is conductively disconnected from the electronic device and thereby cannot provide power to the electronic device.

According to another aspect of the present invention, a system for managing a removal of a battery comprises an electronic device with (a) a battery coupling interface, (b) a battery removal detector, and (c) a controller configured to control a memory device of the electronic device. The battery coupling interface may include a plurality of battery coupling contacts configured to engage with a plurality of battery contacts of the battery in an installed position of the battery. The battery removal detector is configured to detect, based on signals received via the battery coupling interface, an ongoing battery removal process of the battery during which a first subset of the battery contacts are disconnected from a corresponding first subset of the battery coupling contacts and a second subset of the battery contacts remains connected with a corresponding second subset of the battery coupling contacts. The battery removal detector may output a battery removal signal in response to detecting the ongoing battery removal process. The controller may be configured to receive the battery removal signal from the battery removal detector, and in response, control a memory device of the electronic device to prevent or complete a defined operation prior to a completion of the battery removal process in which the second subset of battery contacts are disconnected from the second subset of battery coupling contacts, to thereby prevent a corruption of the memory device.

According to another aspect of the present invention, a method is provided for managing a removal of a battery from an electronic device, wherein the battery includes a plurality of battery contacts and the electronic device includes a battery coupling interface including a plurality of battery coupling contacts configured to engage with the plurality of battery contacts in an installed position of the battery. The method may include detecting, based on signals received via the battery coupling interface, an ongoing battery removal process of the battery during which a first subset of the battery contacts are disconnected from a corresponding first subset of the battery coupling contacts and a second subset of the battery contacts remains connected with a corresponding second subset of the battery coupling contacts. The method may further include, in response to detecting the ongoing battery removal process, and still during the battery removal process, controlling a memory device of the electronic device to prevent or complete a defined operation prior to a completion of the battery removal process in which the second subset of battery contacts are disconnected from the second subset of battery coupling contacts, to thereby prevent a corruption of the memory device.

According to yet another aspect of the present invention, a battery for an electronic device may include a plurality of battery contacts configured to engage with a plurality of battery coupling contacts of the electronic device in an installed position of the battery with respect to the electronic device. The battery may also include a temperature-dependent electronic device connected to a first battery contact of the plurality of battery contacts and configured to communicate temperature information to the electronic device via a first battery coupling contact of the plurality of battery coupling contacts in the installed position of the battery. The plurality of battery contacts may be configured such that, during a removal of the battery from the battery coupling interface, the first battery contact becomes disconnected from the first battery coupling contact while a second battery contact remains connected to a corresponding second battery coupling contact for providing power from the battery to the electronic device during the removal of the battery from the electronic device. The disconnection of the first battery contact from the first battery coupling contact creates an open-circuit condition that may be detected by a battery removal detector provided in the electronic device.

The basic idea of the aforementioned aspects of the present invention is to provide systems and methods to prevent memory device corruption or other harmful effects of a hot removal of a battery from an electronic device, for example, from a battery-powered wireless headset. This may be particularly beneficial for those who use wireless devices (e.g., Bluetooth headsets) for long periods of time, as it provides the ability to swap out the battery (e.g., to replace a drained battery with a charged battery) without the necessity of powering down the device beforehand. It should be understood that the present invention is not limited to the field of headsets or wearable devices, but may apply to any battery-powered electronic devices, including flash memory based devices.

The above aspects and other aspects of the invention will be apparent from and elucidated with reference to the embodiments described hereinafter.

DETAILED DESCRIPTION OF PREFERRED EMBODIMENTS

Technical features described in this application can be used to construct various embodiments of systems and methods for managing a removal of a battery from an electronic device. Some embodiments of the invention are discussed so as to enable one skilled in the art to make and use the invention.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

As the inventors of the instant invention have ascertained, battery-powered devices, that utilize flash memory may be affected by removing the battery without first powering down the device. For example, if the battery is removed (cutting off power to the device) while data is being written to the flash memory, the memory may be corrupted, which may effectively ruin the device.

For example, battery-powered flash-based wireless headsets (e.g., Bluetooth headsets) can be prone to an unrecoverable condition if power is interrupted when persistent storage keys are being written and stored. Removing a battery during the writing of these persistent storage keys can render the headset useless and unrecoverable. To provide such a headset with a replaceable/swappable battery, the user is responsible for powering off the headset (e.g., via a power switch) before removing the battery, e.g., to swap it out for a fresh battery. However, the user may forget or choose not to power off the headset before removing the battery, which may cause the problems discussed above.

Thus, a need exists for a battery-powered flash-based wireless headset having a swappable battery that can be safely removed while the headset is powered on. For instance, enterprise and call center users often communicate on their desk or PC phone many hours a day. These users typically prefer the freedom of wireless (e.g., Bluetooth) headsets as they allow for freedom of movement throughout a working space, and thus would greatly benefit from the ability to swap out the headset battery (replacing a drained battery with a charged battery) multiple times a day.

Accordingly and in a first exemplary aspect, a system for managing a removal of a battery from an electronic device may include a battery removal detector and a controller. The battery removal detector may include (a) sensor electronics configured to detect an ongoing battery removal process of the battery during which the battery remains conductively coupled to the electronic device to provide power to the electronic device; and/or (b) signaling electronics configured to output a battery removal signal in response to detecting the ongoing battery removal process by the sensor electronics. The controller may include electronics configured to (a) receive the battery removal signal from the battery removal detector, and/or (b) in response to receiving the battery removal signal and during the ongoing battery removal process, automatically control a memory device of the electronic device to prevent or complete a defined operation prior to a completion of the battery removal process in which the battery is conductively disconnected from the electronic device and thereby cannot provide power to the electronic device.

The present aspect provides a system that allows a user of an electronic device to remove the battery (e.g., to swap out a drained battery for a charged battery) without requiring the user to power off the device before the battery is removed. The present aspect thus increases usability, while at the same time avoids damage to the device.

The electronic device may be of any suitable type. In some embodiments, the electronic device is a battery-powered wireless (mobile) device and/or a battery-powered flash (memory) based device. Flash memory is particularly prone to get corrupted when power is lost during a memory write operation, so that the present aspect is particularly beneficial with flash memory. It is however noted that in general, the memory device as discussed herein may be of any suitable type.

In some embodiments, the battery-powered device, is a wearable device, such as a headset device. The term "wearable device" as used herein comprises all types of wearable electronic devices that can be worn or attached to clothing during use. For example, a wearable device may be a headset, a smart watch or smart glasses.

In the context of this application, the term "headset" comprises all types of headsets, headphones, and other head-worn audio playback devices, such as for example circumaural and supra-aural headphones, ear buds, in-ear headphones, and other types of earphones. The headset can be of mono, stereo, or multichannel setup.

The battery removal detector and the controller of the electronic device may comprise any type of circuitry, such as discrete and/or integrated circuitry. In some embodiments, the battery removal detector and/or the controller are integrated circuit semiconductor devices. The battery removal detector and the controller may in some embodiments be formed integrally with each other, for example in a single integrated circuit semiconductor device.

The controller, e.g., may comprise a microcontroller or Soc (System on Chip), For example the controller may comprise a Bluetooth controller to provide the functionality discussed herein. The Bluetooth controller may in some embodiments be configured for wireless communications in the frequency band of 2.400-2.485 GHz. In some embodiments, the controller comprises a memory controller for controlling the memory device, such as a flash memory controller. The memory device may in some embodiments be formed integrally with the controller and/or the battery removal detector, for example in a single integrated circuit semiconductor device.

As discussed in the preceding, the battery removal detector comprises sensor electronics to determine an ongoing battery removal process and signaling electronics to output a battery removal signal to the controller in response to detecting an ongoing battery removal.

The sensor electronics and the signaling electronics may be of any suitable type of discrete or integrated circuitry and may be formed integrally with each other or as separate components.

For example, the sensor electronics may be configured to detect a disconnection of at least one first conductive coupling between the battery and the electronic device, which indicates that a battery removal process has begun. Accordingly, and in some embodiments, the sensor electronics may be configured to detect a disconnection of at least one first conductive coupling between the battery and the electronic device while at least one second conductive coupling between the battery and the electronic device, which allow a continued supply of power from the battery to the electronic device, remains connected.

As another example and in some embodiments, the sensor electronics may include at least one sensor, e.g., a Hall sensor, configured to detect a physical movement of the battery relative to the electronic device.

In some embodiments, the system includes a physically actuatable element that is automatically actuated during an ongoing battery removal process, and the sensor electronics are configured to detect the actuation of the physically actuatable element during the ongoing battery. In some embodiments, the physically actuatable element comprises a physical button or flexible element that moves or experiences a shape change during the ongoing battery removal process. In some embodiments, the physically actuatable element comprises a conductive element that conductively disconnects from a corresponding conductive element during the ongoing battery removal process.

In another example aspect, a system for managing a removal of a battery from an electronic device may include (a) a battery coupling interface provided in the electronic device, (b) a battery removal detector, and/or (c) a controller configured to control a memory device (e.g., flash memory) of the electronic device. The battery coupling interface provided in the electronic device may include a plurality of battery coupling contacts configured to engage with a plurality of battery contacts of the battery in an installed position of the battery. The battery removal detector is configured to detect, based on signals received via the battery coupling interface, an ongoing battery removal process of the battery during which a first subset of the battery contacts are disconnected from a corresponding first subset of the battery coupling contacts and a second subset of the battery contacts remains connected with a corresponding second subset of the battery coupling contacts. The battery removal detector may output a battery removal signal in response to detecting the ongoing battery removal process. The controller may be configured to receive the battery removal signal from the battery removal detector, and in response, control a memory device of the electronic device to prevent or complete a defined operation prior to a completion of the battery removal process in which the second subset of battery contacts are disconnected from the second subset of battery coupling contacts, to thereby prevent a corruption of the memory device.

The present aspect provides a particularly efficient and reliable detection of an ongoing battery removal from an electronic device. As will be apparent, the present aspect is based on the underlying principle that one or more of the battery coupling contacts, namely the first subset, are disconnected from the battery and that one or more other battery coupling contacts, namely the second subset, remain connected to the battery at first, to allow providing power to the electronic device during the battery removal.

The system and in particular the electronic device according to the present aspect and in further embodiments may be configured according to one or more of the embodiments, discussed in the preceding with reference to the preceding aspect. With respect to the terms used for the description of the present aspect and their definitions, reference is made to the discussion of the preceding aspect.

The discussed battery contacts and the battery coupling contacts may be of any suitable type, such as for example contact pads, pins, receptacles pins, tabs, leaves, rails, slots, grooves, other male- or female-type connectors, or any other type (s) of connectors, to allow a galvanically conducting connection when engaged.

In some embodiments, the battery removal detector comprises a detection (integrated) circuit that monitors for changes in a signal (e.g., voltage) when the battery begins to be removed from the headset. In some embodiments, the battery and/or the electronic device may include physical structures that provide a physically aligned insertion of the battery into a battery compartment in the electronic device, which brings the battery contacts into contact with the respective battery coupling contacts in the battery compartment of the electronic device. In some embodiments, the battery is a battery pack.

In some embodiments, the battery contacts of the battery and/or battery coupling contacts of the electronic device are configured such that when the battery is physically removed from the battery compartment (or otherwise disconnected from the battery coupling interface), one or more particular battery contacts, referred herein as the first subset of battery contacts, become disconnected from their respective battery coupling contact(s), referred herein as the first subset of battery coupling contacts, prior to the remaining battery contact(s) disconnecting from their respective battery coupling contact(s).

In some embodiments, the first subset of the battery coupling contacts includes exactly one battery coupling contact. In some embodiments, at least one of the second subset of battery coupling contacts is configured to receive power from the battery during the ongoing battery removal process, i.e., until all battery contacts are disconnected from the respective battery coupling contacts of the electronic device.

In some embodiments, a particular (or multiple) battery contact or battery coupling contact may be formed shorter, smaller, or otherwise shaped, sized, or positioned differently than the other battery contacts or battery coupling contacts, meaning that the particular battery contact/battery coupling contact disengages from its respective battery coupling contact/battery contact slightly prior to the other engaged contacts being disengaged from each other during the battery removal process, e.g. when a user removes the battery from the electronic device. In some embodiments, a particular (or multiple) battery contact or battery coupling contact is formed shorter than the other battery contacts or battery coupling contacts in a direction of battery removal.

If the battery is removed while the electronic device is powered on, the quicker disengagement of the particular battery contact/battery coupling contact may be detected by the battery removal detector, e.g., based on a detected voltage change. In some embodiments, the battery removal detector comprises a voltage detector device for this purpose. In some embodiments, the battery removal detector is configured to determine the ongoing battery removal process by detecting an open-circuit condition, e.g., by voltage measurement or impedance measurement.

In response, while the device is still battery-powered via the remaining still-engaged battery contacts/battery coupling contacts, the controller may prevent the initiation of and/or force the immediate completion of particular operation(s) to protect the electronic device and/or data stored in the electronic device from potential harmful effects resulting from the hot-removal of the battery.

For example, the controller may force the completion of particular type(s) or operations prior to the disengagement of the remaining engaged battery contacts, i.e., prior to the battery power being cut-off from the device. For instance, in an electronic device with a memory device having flash memory, the controller may prevent the initiation of write operations to the flash memory and force the completion of write operations in progress prior to the disengagement of the remaining engaged battery contacts, in order to avoid a situation in which data, such as persistent storage keys are being written to memory at the moment the battery power is cut off, which can corrupt the flash memory and effectively render the electronic device inoperable.

In order to force the completion on write operations in progress prior to the disengagement of the remaining engaged battery contacts, the controller may in some embodiments enforce a predefined deadline that provides a desired factor of safety, e.g., based on experimental data regarding the particular headset and battery configuration. The specific configuration of the battery contacts/battery coupling contacts may define a reference delay time between (a) disengagement of the particular contacts (allowing detection of an initiated battery removal process) and (b) disengagement of the remaining contacts that provide continued connection of the electronic device to the battery. This reference delay time may be, for example, a nominal delay time, minimum delay time, or average delay time, based on test data from multiple battery removal processes. In some embodiments, the controller may force the completion of particular operations within a predefined time based on (e.g., shorter than) this reference delay time. For example, if the test data indicates that the reference delay time is 10 ms, the controller may enforce a shorter deadline, e.g., 4 ms, for the completion of any ongoing persistent storage key writing operations. This may better ensure that there is no corruption of the persistent storage that could effectively render the electronic device inoperable or unrecoverable.

In some embodiments, the controller comprises at least one interrupt pin and the battery removal detector is configured to provide the battery removal signal to the interrupt pin of the controller. This setup may allow fast action by the controller once a battery removal process is determined.

In some embodiments, the system of the present aspect additionally comprises the battery, which may be of any suitable type. For example, the battery may be a rechargeable battery, e.g., rechargeable lithium ion battery, rechargeable nickel cadmium battery, rechargeable nickel metal hydride battery, or rechargeable sealed lead acid battery.

In some embodiments, the first subset of the battery coupling contacts includes first battery coupling contact, configured to receive a battery temperature signal from the battery via a corresponding first battery contact in the installed position of the battery.

In some embodiments, the battery includes a negative temperature coefficient (NTC) resistor connected to the first battery contact.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1:
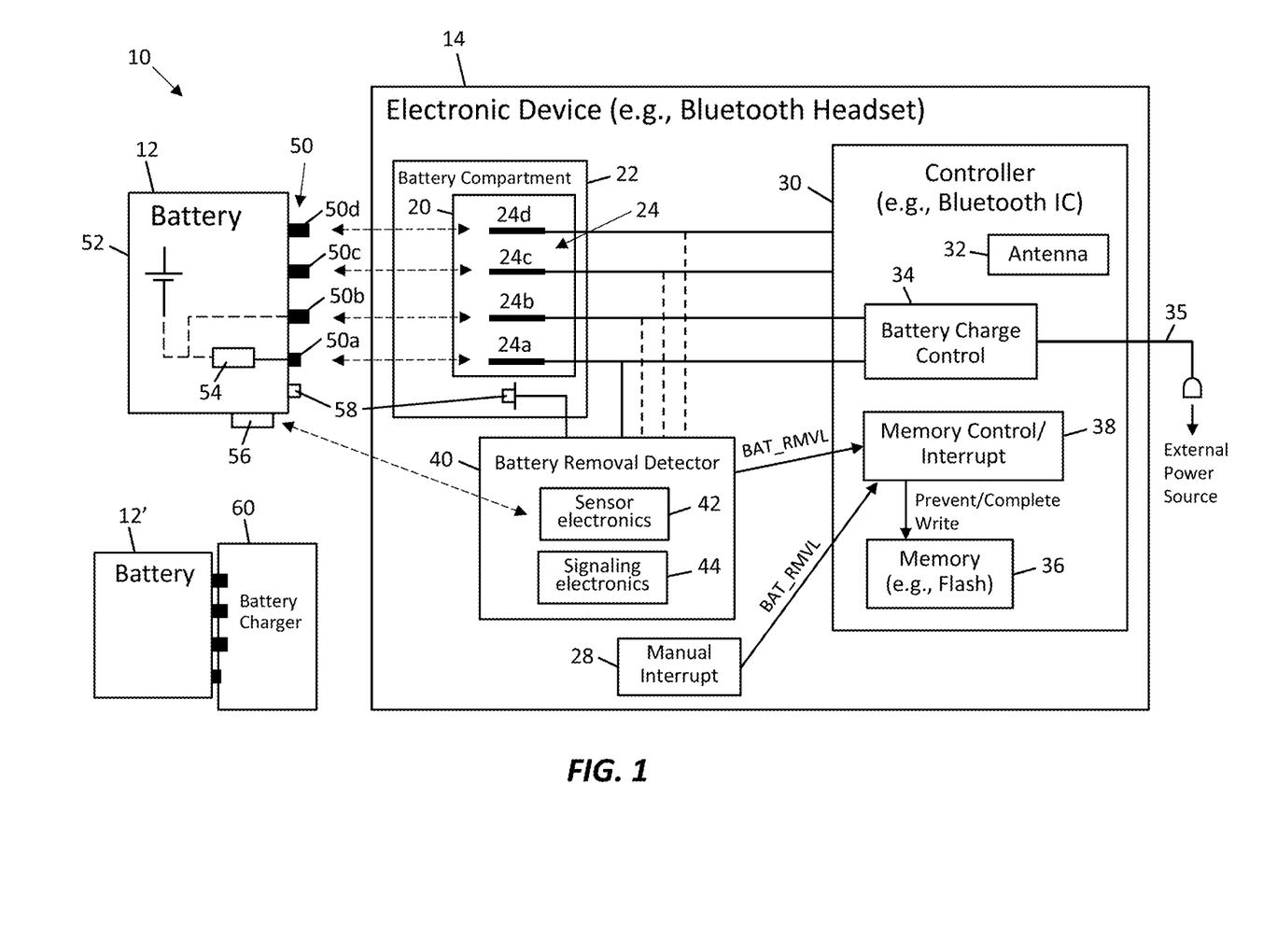
FIG. 1 shows an example system for managing a removal of a battery from an electronic device, according to an example embodiment.

FIG. 1 shows an example system 10 for managing a removal of a battery 12 from an electronic device 14, according to an example embodiment. Electronic device 14 may be any type of electronic device configured to be powered by battery 12 at least temporarily. In example embodiments discussed herein, electronic device 14 may be a battery-powered wireless wearable device, such as a headset (which may also be configured for wired connection to a computer or other power source), e.g., a battery-powered Bluetooth headset. System 10 may be configured to allow battery 12 to be removed (e.g., for replacement with a more fully charged battery 12') while device 14 is powered on, without harming device 14 or data storage within device 14.

As shown, battery 12 may include a battery body 52 and a set of conductive battery contacts 50 for connecting battery 12 to electronic device 14 to provide power to device 14. Battery 12 may be any type of chargeable or non-chargeable battery, for example, a chargeable lithium ion battery, nickel cadmium battery, nickel metal hydride battery, or small sealed lead acid battery.

Battery contacts 50 may include any number and type(s) of contacts configured to engage with corresponding battery coupling contacts 24 provided in device 14 (discussed below). For example, battery contacts 50 may include conductive pins, contact pads, tabs, leaves, rails, slots, grooves, other male- or female-type connectors, or any other type(s) of connectors for contacting respective battery coupling contacts 24 provided in device 14. In some embodiments, battery contacts 50 may be spring-loaded or otherwise flexible and/or resilient, to thereby provide a biased contact between battery contacts 50 and respective battery coupling contacts 24. Battery contacts 50 may be formed or secured directly to the battery body 52, or provided in a clip or other connector housing coupled to the battery body 52 by conductive wires. As discussed in further detail below, the set of battery contacts 50 and/or battery coupling contacts 24 may be designed such that, when battery 12 is being removed from electronic device 14 while the device 14 is powered on (i.e., a "hot battery removal"), a first subset of the battery contacts 50 disengage from the corresponding battery coupling contact(s) 24 shortly before the remaining battery contacts 50 disengage from the corresponding battery coupling contact(s) 24, such that the battery removal may be detected in order to protect the device 14 from potentially harmful effects of the hot battery removal.

In some embodiments, battery 12 may include a negative temperature coefficient (NTC) resistor 54, also referred to as an NTC thermistor, connected to one or more battery contacts 50. As discussed below, device 14 may be configured to use NTC thermistor 54 to detect a temperature of battery 12, e.g., for controlling a charging of battery 12 via device 14. In other embodiments, battery 12 may not include an NTC thermistor for detecting the battery temperature or may use a positive temperature coefficient resistor (PTC).

As shown in FIG. 1, electronic device 14 may include a battery compartment 22 for receiving a removable 4.2V battery 12 (and replacement battery 12'), a controller 30 for controlling various operations of device 14, e.g., relating to wireless communications, and a battery removal detector 40 for detecting a removal of battery 12 from device 14.

Battery compartment 22 may be configured to physically receive the body of battery 12, and may include a battery coupling interface 22 including battery coupling contacts 24 configured for conductive connection with battery contacts 50 when battery 12 is installed in device 14. Like battery contacts 50, battery coupling contacts 24 may include conductive pins, contact pads, tabs, leaves, rails, slots, grooves, other male- or female-type connectors, or any other type(s) of connectors for contacting respective battery contacts 50. In some embodiments, battery coupling contacts 24 may be spring-loaded or otherwise flexible and/or resilient, to thereby provide a biased contact between battery coupling contacts 24 and respective battery contacts 50. Battery coupling contacts 24 may be formed or secured directly to a housing or body of device 14, or may be provided in a clip or other connector housing coupled to the device 14 by conductive wires.

Controller 30 may be configured to control various operations of device 14, e.g., operations relating to wireless communications. In some embodiments, controller 30 may comprise a Bluetooth IC. As shown, controller 30 may include an antenna 32 (e.g., Bluetooth antenna), battery charge control electronics 34, memory device(s) 36, memory control electronics 38, and/or any other suitable components for performing various functions of electronic device 14. Antenna 32 may be configured for wireless communications with an external antenna. For example, in an embodiment in which device 14 is a Bluetooth headset, antenna 32 may comprise a Bluetooth antenna configured to wirelessly communicate audio data with an external phone, computer, or other nearby device.

Battery charge control electronics 34 may be configured to control a charging of battery 12 installed in device 14, e.g., where device 14 is connected to an external power supply (e.g., an outlet, a computer, USB port, etc.) by a charging cable 35. In an embodiment in which battery 12 includes an NTC thermistor 54, battery charge control electronics 34 may detect a temperature of battery 12, e.g., based on a measured voltage across NTC thermistor 54, and control a charge current applied to battery 12 based on the detected battery temperature. For example, control electronics 34 may reduce or switch-off the charging current when the detected battery temperature exceeds a threshold temperature, e.g., 30 degrees Celsius, to avoid overheating of the battery 12.

Memory device(s) 36 may include any one or more types of data storage devices, e.g., including volatile and/or non-volatile memory devices. In some embodiments, memory device(s) 36 includes flash memory configured to store any suitable data, e.g., persistent storage keys written to the flash memory.

Battery removal detector 40 may be configured to detect battery 12 being removed from device 14, during and before the completion of the battery removal. Battery removal detector 40 may include sensor electronics 42 configured to detect an ongoing battery removal process and signaling electronics 44 configured to output a battery removal signal in response to a battery removal process detected by sensor electronics 42.

Sensor electronics 42 may include one or more sensor and/or electronics (e.g., processor, other software, and/or firmware) configured to analyze data generated by such sensor(s) to detect a battery removal process, in particular while the battery removal process is ongoing and not yet completed (i.e., while the battery is still able to provide power to electronic device 14). In some embodiments, as discussed below in detail, sensor electronics 42 may be configured to detect a physical disconnection of at least one conductive connection between battery 12 and electronic device 14, for example, to detect a disconnection of at least one first conductive connection between battery 12 and electronic device 14 (before disconnection of at least one second conductive connection between battery 12 and electronic device 14), for example, by detecting a voltage or voltage change exceeding a defined voltage threshold value, e.g., indicating an open circuit condition.

In other embodiments, sensor electronics 42 may include at least one sensor configured to detect an ongoing battery removal process in a manner other than detecting a physical disconnection of conductive contact(s) between battery 12 and electronic device 14. For example, sensor electronics 42 may include at least one sensor configured to detect a physical movement of the battery relative to the electronic device, or to detect a removal or opening of a battery cover or housing component. In some embodiments, sensor electronics 42 may include at least one sensor configured to detect a relative movement of a sensible element 56, e.g., a magnet or conductive element, contained within or affixed to the body 52 of battery 12. In one embodiment, sensor electronics 42 may include a Hall effect sensor attached to the electronic device 14 and configured to detect a relative movement of battery 12 or a sensible element 56 (e.g., magnet) contained in or affixed to battery 12.

Signaling electronics 44 of battery removal detector 40 may include any electronics (e.g., processor, other hardware, software, and/or firmware) configured to output a battery removal signal (e.g., BAT_RMVL shown in FIG. 1) in response to sensor electronics 42 detecting an ongoing battery removal process.

In one example embodiment discussed below with reference to FIG. 2, sensor electronics 42 and signaling electronics 44 are collectively embodied by a voltage detector IC that is (a) connected to a particular contact that disconnects from a respective battery contact while other contacts between the battery 21 and device 14 remain briefly connected during battery removal, (b) capable of detecting a voltage over the particular contact that falls outside of a defined voltage range (thereby indicating an open circuit on the particular contact), and (c) further capable of outputting a BAT_RMVL signal to memory control electronics 38 in controller 30 in response to detecting the outlying voltage.

Referring to FIG. 1, battery removal detector 40 may be connected to one or more battery coupling contacts 24 and configured to detect, based on signals received via the battery coupling contacts 24, that the battery 12 is being removed. For example, battery removal detector 40 may detect a battery removal in response to detecting an open circuit condition through one or more battery coupling contacts 24, e.g., an open circuit through a particular battery coupling contact 24 (e.g., contact 24*a*) that disconnects from a respective battery contact (e.g., contact 50*a*) before other coupling contacts 24 (e.g., contacts 24*b*-24*d*) disconnect from their respective battery contacts (e.g., contacts 50*b*-50*d*) during the battery removal process. In some embodiments, battery removal detector 40 may detect an open circuit condition based on a detected voltage, voltage change, impedance, or impedance change (e.g., relative to one or more threshold voltage or impedance values) resulting from the particular battery coupling contact 24 (e.g., contact 24*a*) disconnecting from the respective battery contact (e.g., contact 50*a*).

In response to detecting an open circuit condition, the battery removal detector 40 may generate and send a battery removal signal, BAT_RMVL, to an interrupt pin of memory control electronics 38 in controller 30. Memory control electronics 38 may be configured to receive the battery removal signal, BAT_RMVL, and in response, control at least one memory device 36 to prevent the initiation of particular memory-related operation(s) and/or complete the execution of particular memory-related operation(s) within a defined time period, e.g., 4 ms after receiving the BAT_RMVL signal, to thereby prevent or reduce the likelihood that a memory-related operation is ongoing when the battery becomes fully disconnected from the device 14 and thus no longer provides operating power, and thereby prevent or reduce the likelihood of a memory corruption event caused by the hot battery removal.

As discussed above, the duration of the deadline (e.g., 4 ms) enforced by the memory control electronics 38 for completion of particular memory-related operation(s) may be selected and programmed as a function of a configuration-dependent delay time (e.g., a minimum or average delay time based on test data) between (a) disengagement of the contacts 24*a*/50*a* that allow detection of the battery removal process by battery removal detector 40 and (b) disengagement of the remaining contacts 24*b*-24*d*/50*b*-50*d*, wherein the battery may continue to power device 14 through at least one of such remaining engaged contacts 24*b*-24*d*/50*b*-50*d*. Thus, during the defined time period (e.g., 4 ms) enforced by the memory control electronics 38, controller 30 is still powered by battery 12 (via one or more of the still-engaged contacts 24*b*-24*d*/50*b*-50*d*), which allows memory control electronics 38 to complete any memory-related operation(s) according to the defined protocol.

As mentioned above, the physical structure of battery contacts 50 and/or battery coupling contacts 24 may be designed such that, when battery 12 is being removed from an electronic device 14 while the device 14 is powered on, i.e., a "hot battery removal", a first subset of the battery contacts 50 disengage from the corresponding battery coupling contact(s) 24 shortly before the remaining battery contacts 50 disengage from the corresponding battery coupling contact(s) 24, such that the battery removal detector 40 may detect the battery removal process and trigger protective measures before completion of the battery removal.

In some embodiments, a first subset (one or more) of battery contacts 50 (or at least a conductive portion thereof) may be shorter, smaller, or otherwise shaped, sized, or positioned differently than the remaining battery contacts 50 in a manner that results in the first subset of battery contacts 50 disengaging from the respective battery coupling contact(s) 24 before the remaining battery contacts 50 disengage from their respective battery coupling contacts 24. For example, in the example embodiment shown in FIG. 1, battery contacts 50 comprise conductive contact pads, and a first contact pad 50*a* is formed shorter than the remaining contact pads 50*b*-50*d*, such that during removal of the battery 12 from the battery interface 20 in the device 14, the first contact pad 50*a* disconnects from battery coupling contact 24*a* prior to the other contact pads 50*b*-50*d* disconnecting from their respective battery coupling contacts 24*b*-24*d*. This early disconnection of contact pad 50*a* from battery coupling contact 24*a* creates an open circuit that is detectable by battery removal detector 40, as discussed above.

In other embodiments, the battery coupling contacts 24 provided in the electronic device 14 may be specifically configured to provide the battery removal detection capability. That is, a first subset (one or more) of battery coupling contacts 24 (or at least a conductive portion thereof) may be shorter, smaller, or otherwise shaped, sized, or positioned differently than the remaining battery coupling contacts 24 in a manner that results in the first subset of battery coupling contacts 24 disengaging from the respective battery contact(s) 50 before the remaining battery coupling contacts 24 disengage from their respective battery contacts 50.

As discussed above, in some embodiments, battery 12 may include an NTC thermistor 54 connected to one or more battery contacts 50 to allow battery charge control electronics 34 of controller 30 to control a charging of battery 12 based on the detected battery temperature. In some embodiments, one or more of such battery contacts 50 provided for NTC-based temperature detection may also be utilized as the first subset of battery coupling contacts 24 configured for early disconnection from the respective battery coupling contact(s) 24. In the example shown in FIG. 1, battery contact pad 50a, which is connected to NTC thermistor 54 for providing temperature data to battery charge control electronics 34 via battery coupling contact 24a, is formed shorter than the remaining battery contact pads 50b-50d, such that battery removal detector 40 can detect the disconnection of the NTC battery contact pad 50a from the respective NTC battery coupling contact 24a. In some embodiments, a small current (e.g., from battery 12 or battery charge control 34) may be passed through NTC thermistor 54 even when the battery 12 is not being charged, so that an open circuit condition can be determined.

In other embodiments, one or more other existing battery contacts 50 may be connected to battery removal detector 40 for detection of a battery removal. Alternatively, battery removal detector 40 may be connected to one or more dedicated battery contacts 50 added to battery 12 specifically for battery removal detection.

In other embodiments, electronic device 14 or battery 21 may include, in addition to or as an alternative to other battery detection components or systems disclosed herein, at least one physically actuated element 58 that is automatically actuated during a removal of battery 12 from electronic device 14.

A physically actuated element 58 may include, for example, (a) a button or flexible element (e.g., a spring or other biased metal element) that is depressed or deformed due to contact with a corresponding structure during insertion of battery 12 into battery compartment 22, and restores its position or shape during removal of battery 12 from battery compartment 22, or (b) or a conductive contact element (distinct from battery contacts 50 and battery coupling contacts 24) that comes into contact with a corresponding conductive contact during insertion of the battery 12 into the battery compartment 22, and becomes conductively disconnected from the corresponding conductive contact during removal of the battery 12 from the battery compartment 22 (while the battery 12 is still able to provide power to electronic device 14 through one or more battery contacts 50).

Where a physically actuated element 58 is embodied as a button or flexible element, the actuation of such element 58 during a removal of battery 12 from electronic device 14 is the physical movement or change in shape of the element 58 caused by the physical removal of the battery 12 from battery compartment, e.g., a return to a default position or shape of the element 58 when battery 12 is not inserted in electronic device 14. Where a physically actuated element 58 is embodied as a conductive contact element, the actuation of such element 58 during a removal of battery 12 from electronic device 14 is the disconnection of the element 58 from a corresponding conductive element structure.

Each physically actuated element 58 may be configured such that during removal of battery 12 from battery compartment 22, the actuation of the element 58 is detectable by sensor electronics 42 of battery removal detector 40, while the battery removal process is ongoing and not yet completed, i.e., while the battery 12 is still able to provide power to electronic device 14 through one or more battery contacts 50.

In embodiments in which physically actuated element(s) 58 are provided on the battery 12, element(s) 58 may be internally connected to at least on battery contact 50 to provide a conductive signaling path to sensor electronics 42 of battery removal detector 40, which may be configured to detect the actuation of element(s) 58 during a battery removal process. In embodiments in which physically actuated element(s) 58 are provided at the electronic device 14, e.g., in the battery compartment 22, element(s) 58 may be connected to sensor electronics 42 of battery removal detector 40, which may be configured to detect the actuation of such element(s) 58 during a battery removal process.

In some embodiments, electronic device 14 may include, in addition or alternative to battery removal detector 40, a manual interrupt interface 28 that is manually actuatable to generate and communicate a battery removal signal, BAT_RMVL, to memory control electronics 38, to implement measures to prevent or reduce the likelihood of a memory corruption event caused by the a battery removal, e.g., as discussed above. Thus, a user may actuate manual interrupt interface 28 prior to removing battery 12, e.g., while electronic device 14 is powered on, to trigger an interrupt condition in which battery 12 may be removed safely. Manual interrupt interface 28 may include a switch, a button, a slider, a knob, or any other physical device configured to be manually actuated by a user.

In other embodiments, a manual interrupt interface 28 may alternatively be provided in or on battery 12 instead of electronic device 14. In such embodiments, manual interrupt interface 28 may be conductively connected to memory control electronics 38 in device 14 via a selected battery contact 50 and corresponding battery coupling contact 24 or by any other wired or wireless connection to controller 30.

It should be understood that system 10 shown in FIG. 1 may include any single one of the different battery detection components or systems discussed above, or may include multiple of such battery detection components or systems in combination with each other, e.g., to provide increased detection sensitivity and/or redundancy. Thus, system 10 may include any single one or any combination of more than one of (a) shortened contact(s) 50 or 24, (b) sensor(s) 56, (c) physically actuated element(s) 58, and (d) a manual interrupt 28.

For example, system 10 may include shortened contact(s) 50 or 24 for detecting an ongoing battery removal process, but omit sensor(s) 56, physically actuated element(s) 58, and manual interrupt 28. As another example, system 10 may include sensor(s) 56 for detecting an ongoing battery removal process, but omit the use of shortened contact(s) 50, physically actuated element(s) 58, and manual interrupt 28. As another example, system 10 may include physically actuated element(s) 58 for detecting an ongoing battery removal process, but omit the use of shortened contact(s) 50 or 24, sensor(s) 56, and manual interrupt 28. As another example, system 10 may include a manual interrupt 28, but omit shortened contact(s) 50 or 24, sensor(s) 56, and physically actuated element(s) 58.

As another example, system 10 may include both shortened contact(s) 50/24 and sensor(s) 56 for detecting an ongoing battery removal process (e.g., to provide increased detection sensitivity and/or redundancy), but omit physically actuated element(s) 58 and manual interrupt 28. As another example, system 10 may include both shortened contact(s) 50/24 and physically actuated element(s) 58 for detecting an ongoing battery removal process (e.g., to provide increased detection sensitivity and/or redundancy), but omit sensor(s) 56 and manual interrupt 28. As another example, system 10 may include both sensor(s) 56 and physically actuated element(s) 58 for detecting an ongoing battery removal process (e.g., to provide increased detection sensitivity and/or redundancy), but omit shortened contact(s) 50/24 and manual interrupt 28. As another example, system 10 may include both shortened contact(s) 50/24 and a manual interrupt 28, but omit sensor(s) 56 and physically actuated element(s) 58.

As discussed above, system 10 may allow for hot removal of battery 12, e.g., to replace a charge-depleted battery 12 with a replacement battery. Thus, system 10 may also include one or more replacement batteries 12', each similar or identical to battery 12, and a battery charger 60, e.g., embodied as a charging dock or charging cable, and as shown in FIG. 1.

Figure 2:
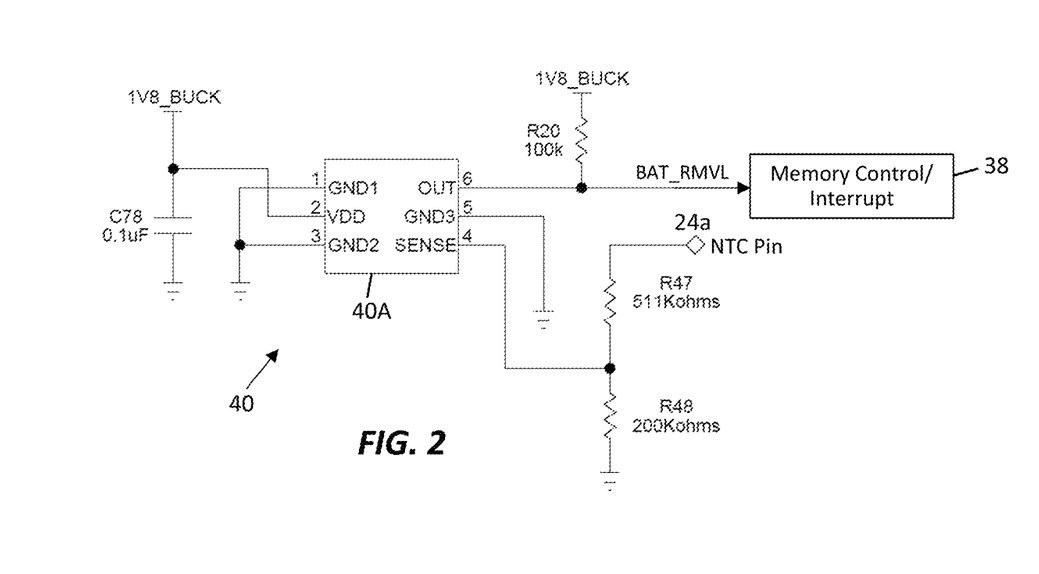
FIG. 2 shows an example battery removal detector circuit for use in the system of FIG. 1, according to one example embodiment.

FIG. 2 shows one example of a battery removal detector circuit 40 for use in system 10 shown in FIG. 1, according to one example embodiment. In this example, battery removal detector circuit 40 includes a voltage detector IC 40A having (a) one pin (pin #4) connected to an NTC battery coupling contact 24a (which connects to a shortened NTC battery contact 50a, as shown in FIG. 1) and (b) another pin (pin #6) connected to the memory control electronics 38 of controller 30. Thus, in this example, the shortened NTC battery contact 50a has a dual purpose, namely battery temperature sensing and for detecting a battery removal process. In one embodiment, voltage detector IC 40A is a TPS3710DSER Wide-VIN voltage detector from Texas Instruments.

Figure 3:
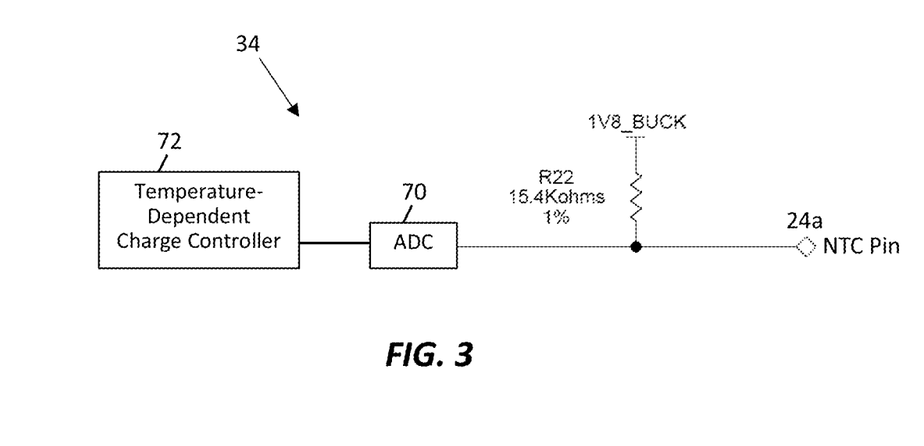
FIG. 3 shows an example temperature-dependent battery charge circuit for use in the system of FIG. 1, according to one example embodiment.

As shown in FIG. 3, the NTC battery coupling contact 24a also connects to an ADC input 70 and a temperature-dependent charge controller 72 provided in controller 30 (e.g., Bluetooth IC) for temperature-dependent battery charge control, e.g., to prevent or reduce charging current to battery 12 when the battery temperatures falls outside specified temperature limits.

Returning to FIG. 2, upon removal of battery 12 from device 14, the NTC signal at contact 22a is disconnected, which pulls the voltage up to a supply rail voltage (e.g. 1.8V). Voltage detector IC 40A can then detect the open-circuit condition, e.g., using a 10 kohm thermistor with Bvalue=4050 and a 15.4 kohm pull-up resistor to 1.8V. The example detector IC uses a voltage threshold of 400 mV with a 5 mV hysteresis. The voltage divider on the SENSE input is set with 200 kohms and 511 kohms, which causes the detection voltage to occur when the thermistor impedance exceeds 80 kohms, which corresponds to a temperature of approximately −15 degrees Celsius. In other words, thermistor impedances (RTH) greater than 80 kohm (e.g., an open-circuit) will cause the voltage detector to send a signal (BAT_RMVL) to an interrupt pin (e.g., interrupt input pin) in the memory control electronics 38 of the controller 30 (e.g., Bluetooth IC) indicating that battery removal is imminent. The memory control electronics 38 can then act immediately to prepare the device for the imminent battery disconnection, e.g., by preventing the writing of persistent storage keys and/or completing any ongoing persistent storage key write operation within a defined deadline (e.g., 4 ms), to thereby protect the memory 36 from corruption.

As discussed above, e.g., as shown in the example embodiment of FIG. 1, in some embodiments a battery may include at least one contact that is shorter or smaller than the other contacts, with the shorter/smaller battery contact(s) being designed to disconnect from respective battery coupling contact(s) in the electronic device prior to the other battery contact(s) disconnecting from their respective battery coupling contact(s). A battery removal detector may detect this early disconnection of the shorter/smaller battery contact(s) and trigger protective measures (e.g., by a controller) prior to complete disconnection of the battery from the electronic device, e.g., to prevent memory corruption.

Figure 4A:
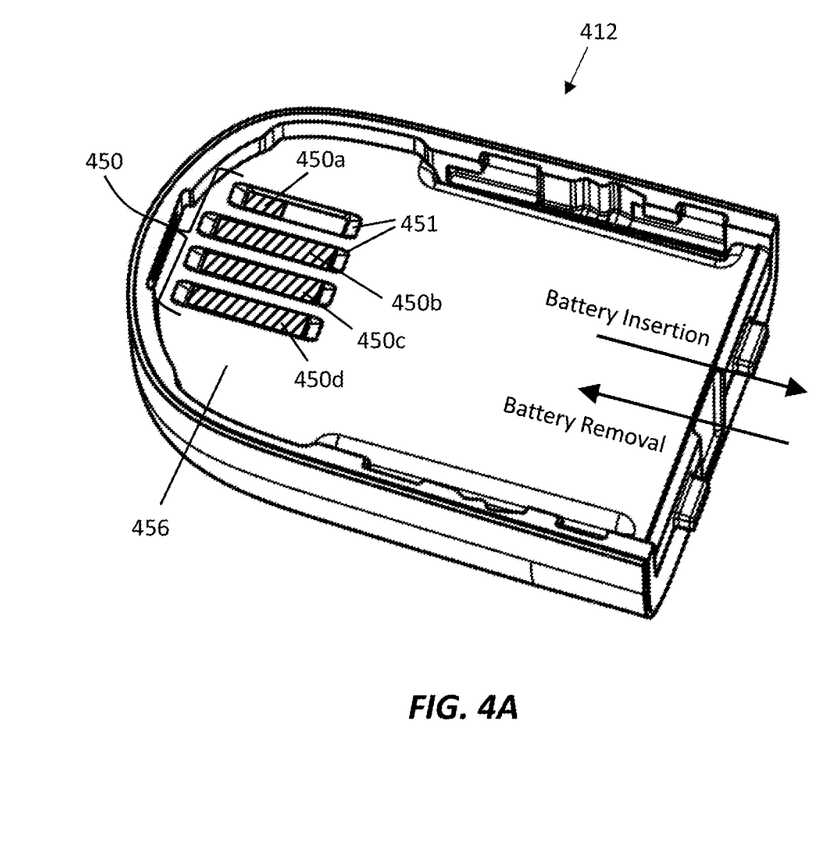
FIG. 4A shows an example battery including a set of conductive contacts having one contact that is shorter than the other contacts, according to one example embodiment.

FIG. 4A illustrates an example battery 412 for use in the example system shown in FIG. 1, according to one embodiment. Battery 412 may include a set of battery contacts 450 configured to conductively engage with a corresponding set of battery coupling contacts when battery 412 is installed in an electronic device. Battery contacts 450 comprise conductive traces on a PCB that are exposed through corresponding openings 451 formed in a battery housing 456. As shown, one battery contact (conductive trace) 450a may be shorter than the other battery contacts 450b-450d, such that during a removal of battery 412 from an electronic device, the shorter battery contact 450a may disconnect from a respective battery coupling contact before the remaining battery contacts 450b-450d disconnect from their respective battery coupling contacts.

Figure 4B:
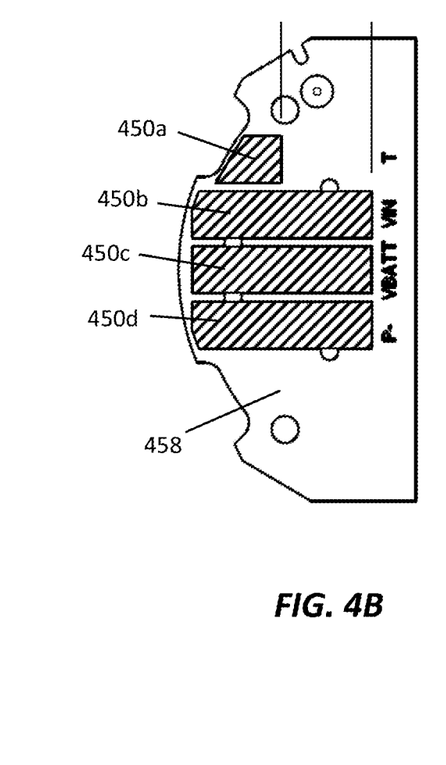
FIG. 4B shows an example PCB with conductive traces, including one shortened trace, for use in the example battery shown in FIG. 4A, according to one example embodiment.

FIG. 4B shows a printed circuit board (PCB) 458 having battery contacts 450a-450d embodied as conductive traces formed on the PCB. As shown, conductive trace 450a is shorter than conductive traces 450b-450d. PCB 458 may be mounted in the battery housing 456 shown in FIG. 4A, with conductive traces 450a-450d projecting through openings 451 formed in the battery housing 456.

Figures 4C, 4D:
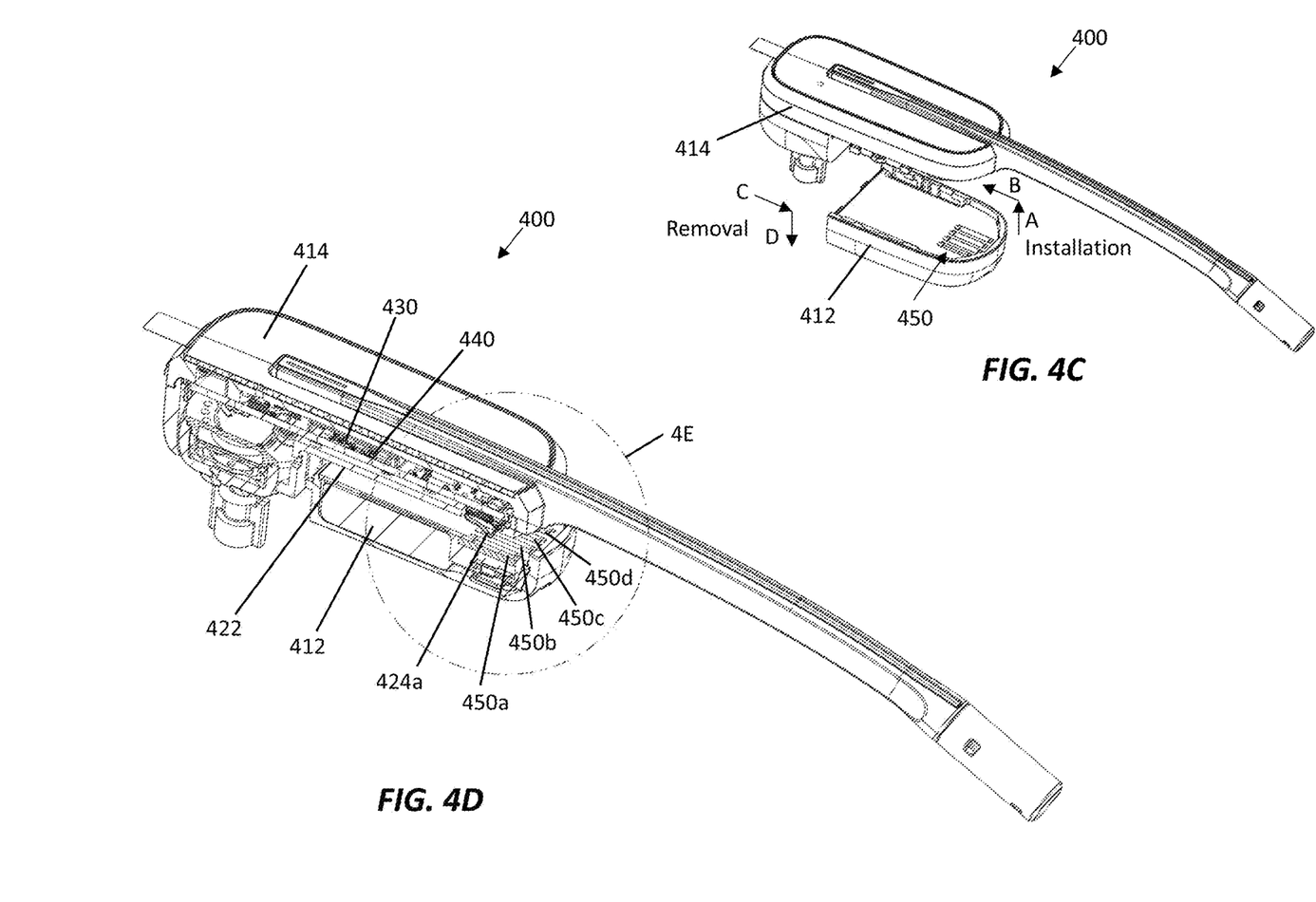
FIG. 4C shows a three-dimensional view of an example headset device and a battery for use in the headset device, according to one example embodiment.
FIG. 4D shows a three-dimensional cross-section view of the example headset device and battery shown in FIG. 4C, according to one example embodiment.

FIG. 4C illustrates an example system 400 including an electronic device 414, specifically a component of a wireless headset, and a battery 412 configured for removable installation in the headset device 414, according to one example embodiment. To install the battery 412 from the position shown in FIG. 4C, a user may move the battery in direction "A" to bring the battery 412 into contact with a battery compartment area of device 414, and then slide the battery in direction "B" to bring battery contacts (conductive traces) 450a-450d into contact with corresponding battery coupling contacts provided in the battery compartment area of device 414. The user may subsequently remove the battery 412 from device 414 by following a reverse process, i.e., sliding the battery 412 in direction C and then away from device 414 generally in direction D.

FIG. 4D shows a cross-sectional view of headset device 414 and battery 412, with battery 412 located near battery compartment 422 and with battery contacts (conductive traces) 450a-450d located near, but not in contact with, corresponding battery coupling contacts of device 414. A single battery coupling contact (spring contact) 424a, designed to conductively engage with the short battery contact 450a, can be seen in the cross-sectional view of FIG. 4D. Three additional battery coupling contacts (spring contacts), designed to conductively engage with battery contacts 450b-450d, are hidden in the view of FIG. 4D. A magnified view of the area labelled 4E is shown in FIG. 4E, which is discussed below.

FIG. 4D also shows an example battery removal detector 440 configured to detecting a removal of battery 412 from device 414 (e.g., based on disconnection of the short battery contact 450a from spring contact 424a during a removal of the battery 412), and an example controller 430 configured to implement safety measures in response to a detected batty removal process, e.g., preventing or completing a persistent data key writing process in a memory (e.g., flash memory) in device 414 prior to a completion of the detected battery removal process, e.g., as discussed above.

Figure 4E:
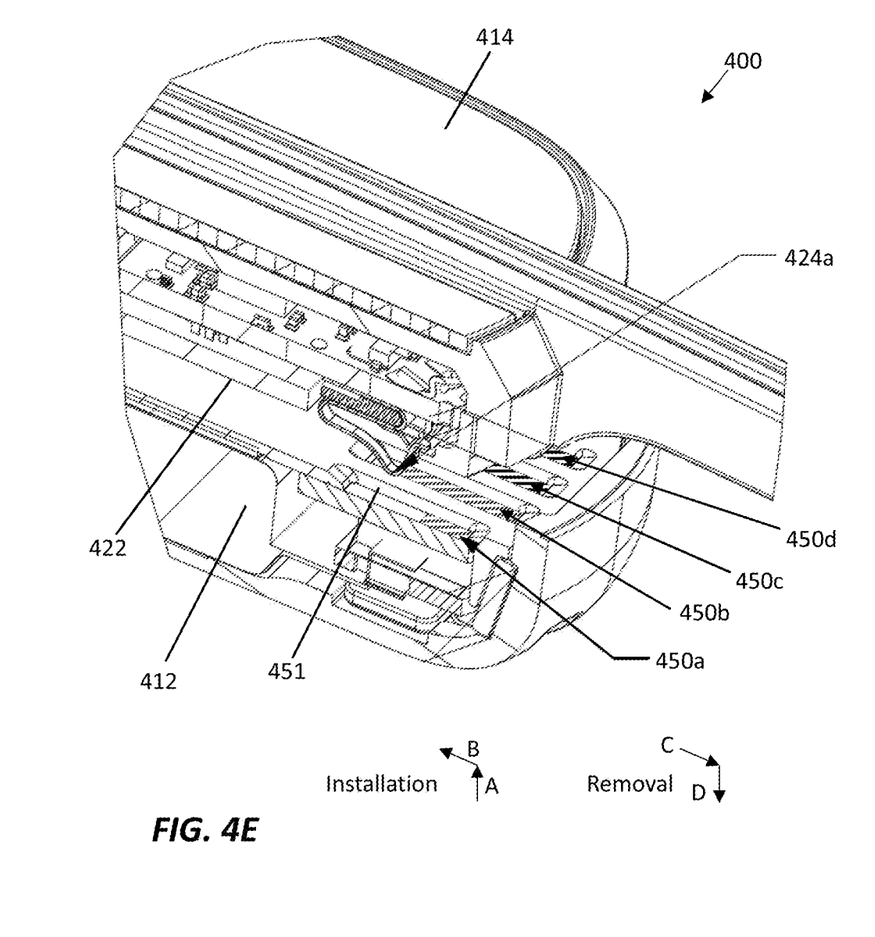
FIG. 4E shows a magnified view of area 4E shown in FIG. 4D, which illustrates the relationship between battery contacts provided in the battery and battery coupling contacts provided in the headset device, according to one example embodiment.

FIG. 4E is a magnified view of the area labelled 4E in FIG. 4D. As shown, battery 412 includes battery contacts (conductive traces) 450a-450d that are exposed through openings 451 in a housing of battery 412. When the battery 412 is installed, e.g., by moving battery 412 in direction A followed by direction B, the four spring contacts of device 414 (including visible spring contact 424a) come into contact with the respective conductive traces 450a-450d on battery 412, to thereby provide power and signaling from battery 412 to headset device 414. During a removal of the battery 412, which first involves sliding the battery 412 in direction C, spring contact 424a disconnects from conductive trace 450a before the other spring contacts disconnect from their respective conductive traces 450b-450d. During the period in which spring contact 424a has disconnected from conductive trace 450a but the remaining spring contacts are still in contact with traces 450b-450d, the battery removal detector 440 may detect the battery removal process (based on an open circuit caused by disconnection of spring contact 424a from trace 450a) and controller 430 may implement the relevant safety measures (e.g., preventing or completing a persistent data key writing process) prior to the remaining spring contacts disconnecting from traces 450b-450d as the battery is slid further along direction C.

While the invention has been illustrated and described in detail in the drawings and foregoing description, such illustration and description are to be considered illustrative or exemplary and not restrictive; the invention is not limited to the disclosed embodiments. Thus, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims and/or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A system for managing a removal of a battery, the system comprising an electronic device including:
   a battery coupling interface, the battery coupling interface including a plurality of battery coupling contacts configured to engage with a plurality of battery contacts of the battery in an installed position of the battery;
   a battery removal detector configured to
      detect, based on signals received via the battery coupling interface, an ongoing battery removal process of the battery during which a first subset of the battery contacts are disconnected from a corresponding first subset of the battery coupling contacts and a second subset of the battery contacts remains connected with a corresponding second subset of the battery coupling contacts; and
      in response to detecting the ongoing battery removal process, output a battery removal signal during the battery removal process; and
   a controller configured to
      receive the battery removal signal from the battery removal detector; and
      in response to receiving the battery removal signal and during the battery removal process, control a memory device of the electronic device to prevent or complete a defined operation prior to a completion of the battery removal process in which the second subset of battery contacts are disconnected from the second subset of battery coupling contacts, to thereby prevent a corruption of the memory device.

2. The system of claim 1, wherein at least one of the second subset of battery coupling contacts is configured to receive power from the battery during the ongoing battery removal process.

3. The system of claim 1, wherein the first subset of the battery coupling contacts includes exactly one battery coupling contact.

4. The system of claim 1, wherein the plurality of battery coupling contacts are configured such that when the battery is removed from the battery coupling interface, the first subset of battery contacts becomes disconnected from the first subset of battery coupling contacts before the second subset of battery contacts becomes disconnected from the second subset of battery coupling contacts.

5. The system of claim 4, wherein the first subset of battery coupling contacts are shorter than the second subset of battery coupling contacts.

6. The system of claim 1, further comprising the battery, and wherein the plurality of battery contacts are configured such that when the battery is removed from the battery coupling interface, the first subset of battery contacts becomes disconnected from the first subset of battery coupling contacts before the second subset of battery contacts becomes disconnected from the second subset of battery coupling contacts.

7. The system of claim 6, wherein the first subset of battery contacts are shorter than the second subset of battery contacts.

8. The system of claim 1, wherein the first subset of the battery coupling contacts includes a first battery coupling contact configured to receive a battery temperature signal from the battery via a corresponding first battery contact in the installed position of the battery.

9. The system of claim 8, further comprising the battery, wherein the battery includes a negative temperature coefficient (NTC) resistor connected to the first battery contact.

10. The system of claim 1, wherein the battery removal detector is configured to detect the ongoing battery removal process by detecting an open-circuit condition resulting from disconnection of the first subset of the battery contacts from the corresponding first subset of battery coupling contacts.

11. The system of claim 1, wherein the battery removal detector is configured to output the battery removal signal to an interrupt input of the controller.

12. The system of claim 1, wherein the controller is configured to prevent or complete a write process of persistent storage keys to the memory device prior to the completion of the battery removal process.

13. The system of claim 1, wherein the battery removal detector comprises a voltage detector device.

14. The system of claim 1, wherein the electronic device is a battery-powered headset.

15. The system of claim 1, further comprising the memory device, which memory device comprises flash memory.

16. A method for managing a removal of a battery from an electronic device, wherein the battery includes a plurality of battery contacts and the electronic device includes a battery coupling interface including a plurality of battery coupling contacts configured to engage with the plurality of battery contacts in an installed position of the battery, the method comprising:

detecting, based on signals received via the battery coupling interface, an ongoing battery removal process of the battery during which a first subset of the battery contacts are disconnected from a corresponding first subset of the battery coupling contacts and a second subset of the battery contacts remains connected with a corresponding second subset of the battery coupling contacts; and in response to detecting the ongoing battery removal process, and still during the battery removal process, controlling a memory device of the electronic device to prevent or complete a defined operation prior to a completion of the battery removal process in which the second subset of battery contacts are disconnected from the second subset of battery coupling contacts, to thereby prevent a corruption of the memory device.

17. The method of claim 16, wherein:
the battery removal process is initiated while the electronic device is powered on; and
during the ongoing battery removal process, power is provided from the battery to the electronic device via at least one of the second subset of the battery contacts.

18. A system for managing a removal of a battery from an electronic device, the system comprising:
a battery removal detector comprising:
    sensor electronics configured to detect an ongoing battery removal process of the battery during which the battery remains conductively coupled to the electronic device to provide power to the electronic device; and
    signaling electronics configured to output a battery removal signal in response to detecting the ongoing battery removal process by the sensor electronics; and
a controller comprising electronics configured to:
    receive the battery removal signal from the battery removal detector; and
    in response to receiving the battery removal signal and during the ongoing battery removal process, control a memory device of the electronic device to prevent or complete a defined operation prior to a completion of the battery removal process in which the battery is conductively disconnected from the electronic device and thereby cannot provide power to the electronic device.

19. The system of claim 18, wherein the sensor electronics comprise a sensor configured to detect a physical movement of the battery relative to the electronic device.

20. The system of claim 19, wherein the sensor comprises a Hall sensor.

21. The system of claim 18, wherein the sensor electronics are configured to detect a disconnection of at least one first conductive coupling between the battery and the electronic device while at least one second conductive coupling between the battery and the electronic device remains connected, the at least one second conductive coupling allowing a continued supply of power from the battery to the electronic device.

22. The system of claim 19, comprising a physically actuatable element that is automatically actuated during an ongoing battery removal process, and wherein the sensor electronics are configured to detect the actuation of the physically actuatable element during the ongoing battery removal process.

23. The system of claim 22, wherein the physically actuatable element comprises one or more of a physical button, a flexible element that moves or experiences a shape change during the ongoing battery removal process, and a conductive element that conductively disconnects from a corresponding conductive element during the ongoing battery removal process.

* * * * *